United States Patent [19]
Mitchell

[11] Patent Number: 4,778,392
[45] Date of Patent: Oct. 18, 1988

[54] EDUCATIONAL BLOCK SET

[76] Inventor: Leslie K. Mitchell, 916 W. Alberta St., Anaheim, Calif. 92805

[21] Appl. No.: 911,899

[22] Filed: Sep. 26, 1986

[51] Int. Cl.⁴ .......................................... G09B 250/00
[52] U.S. Cl. ................................. 434/403; 220/6; 206/509; 206/518; 229/113; 229/915; 446/117; 446/488; 434/172; 52/DIG. 10
[58] Field of Search .............. 434/156, 157, 159, 160, 434/167, 170–172, 403, 433; 273/156, 157 R; 206/504, 505, 507, 509, 518; 229/113, 915; 446/69, 117, 488; 220/6, 7; 52/DIG. 10

[56] References Cited

U.S. PATENT DOCUMENTS

| | | | |
|---|---|---|---|
| 550,563 | 11/1895 | Pierce, Jr. | 434/403 |
| 1,230,263 | 6/1917 | Alexander | 434/159 |
| 1,531,542 | 3/1925 | Cogshall | 434/172 |
| 1,533,123 | 4/1925 | Lederer | 128/304 |
| 1,861,206 | 5/1932 | Burgess | 52/DIG. 10 X |
| 1,864,703 | 6/1932 | West | 434/159 |
| 1,895,611 | 1/1933 | Doak | 434/403 |
| 2,345,646 | 4/1944 | Williamson | 229/17 G |
| 2,440,205 | 4/1948 | McLain | 434/167 |
| 2,631,747 | 3/1953 | Stolte | 215/10 |
| 2,886,325 | 5/1959 | Long | 273/157 R |
| 3,101,556 | 8/1963 | DiPonte | 434/159 |
| 3,235,263 | 2/1966 | Smith | 273/156 |
| 3,365,198 | 1/1968 | Hay | 273/157 R |
| 4,003,144 | 1/1977 | Maddestra et al. | 434/403 |
| 4,158,921 | 6/1979 | Stolpen | 434/403 |
| 4,534,736 | 8/1985 | Cogdill | 434/403 |

FOREIGN PATENT DOCUMENTS

| | | | |
|---|---|---|---|
| 2277609 | 3/1976 | France | 434/159 |
| 584634 | 11/1958 | Italy | 434/159 |
| 642234 | 1/1979 | U.S.S.R. | 206/504 |
| 214098 | 4/1924 | United Kingdom | 434/171 |
| 685699 | 1/1953 | United Kingdom . | |
| 1361483 | 7/1974 | United Kingdom | 273/157 R |

*Primary Examiner*—John E. Murtagh
*Assistant Examiner*—Andrew J. Rudy
*Attorney, Agent, or Firm*—Edward E. Roberts

[57] ABSTRACT

A block set, each block including a generally cubical portion with a frusto-pyramidal or convex portion, and an oppositely disposed frusto-pyramidally configured mating concave portion for interlocking. Each of the fourteen surfaces or sides thus formed includes a substantially similar pictorial depiction of an object, such as an animal or the like, with a letter imprinted on the object, preferably in a portion of the object which bears a resemblance to the letter. The edges of each side of the block are colored, with each edge being a different color for promoting color awareness, with the like colored edges of adjacent blocks establishing a preferred orientation for pictorial and indicia alignment. The individual pictorial representations on adjacent surfaces of the same block are oriented in different orthogonal directions for enabling reading of a word on the adjoined surfaces of adjacent blocks on at least one other of the adjoined surfaces of the blocks. The block may be formed as a unitary member or may be formed from foldable blanks formed from a sheet of foldable cardboard or the like.

27 Claims, 4 Drawing Sheets

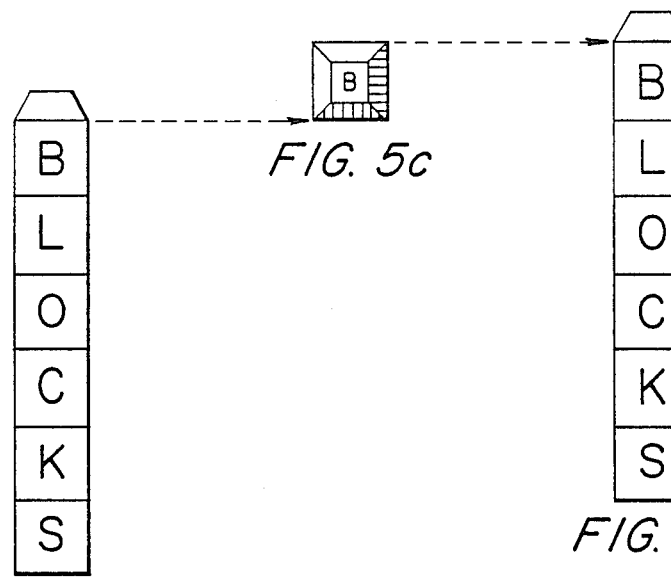
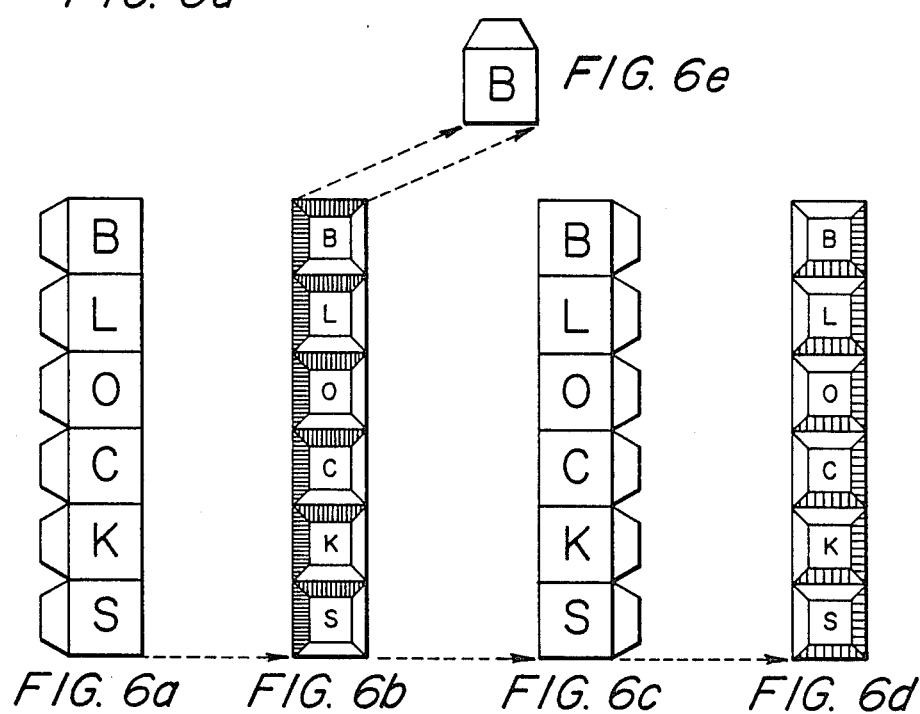
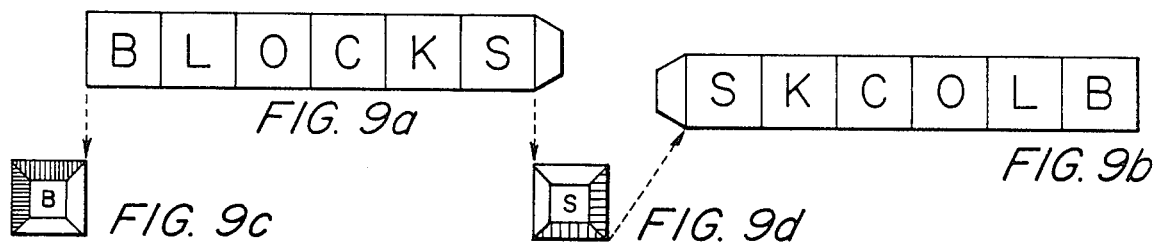

EDUCATIONAL BLOCK SET

BACKGROUND OF THE INVENTION

This invention relates to blocks, and more particularly, to a block set having pictorial representations, indicia and multi-colors for enabling educational, as well as play value.

DESCRIPTION OF THE PRIOR ART

Toys having letter, numerals, and pictorial representations have been used by children of pre-school age for decades, oftentimes as a means for learning the alphabet. Some of such toys have been in the form of block sets having different letters of the alphabet on different sides of the same block. Other such block sets have been provided with interconnecting elements for enabling stacking of the blocks to provide a play setting in addition to a learning setting.

U.S. Pat. No. 1,230,263, issued June 19, 1917 to Alexander for "Cut-Out Alphabet Toy" depicts one such toy configured as an animal, which may be separated into discrete portions, with each portion bearing one letter of the word describing the animal.

U.S. Pat. No. 1,531,542, issued Mar. 31, 1925 to Cogshall for "Toy Block" depicts a block set having letters on the faces thereof with interlocking elements.

U.S. Pat. No. 1,533,122, issued Apr. 14, 1925 to Lederer for "Educational Game" depicts a game, which may be in the form of blocks, in which a side of one game object has a partial pictorial representation, with a plurality of properly oriented and aligned objects being required for a complete picture.

U.S. Pat. No. 1,864,703, issued June 28, 1932, to West, for "Educational Block" discloses a block set, in which the block is configured in the form of a letter of the alphabet, with a pictorial representation of an animal, with the letter thereon being the first letter of the work describing the animal.

U.S. Pat. No. 1,895,611, issued Jan. 31, 1933 to Doaks, for "Building Blocks", discloses a set of interlocking, stackable blocks having alphanumeric indicia thereon.

U.S. Pat. No. 2,440,205, issued Apr. 20, 1948, to McLain for a "Toy Block" shows another block in which the face of the block bears the word of an animal viewable through the transparent surface of the block.

U.S. Pat. No. 2,886,325, issued May 12, 1959, to Long, for a "Three-Dimensional Crossword Puzzle" discloses a puzzle utilizing blocks suitable in layers, with different sets of blocks having different colors, as well as alphabetical indicia.

U.S. Pat. No. 3,101,556, issued Aug. 27, 1963 to Di Ponte, for "Alphabet Set for the Practical Teaching of Reading and Writing", such patent disclosing a stepped stand on which the blocks are supported for assembly and viewing.

French Pat. No. 2 277 609 discloses an educational game for children utilizing blocks with letters on four surfaces joined by mating ribs and recesses.

British Pat. No. 685,699 discloses "Improvements in or relating to Educational Game Apparatus", in which each block bears a letter and a partial pictorial representation of an animal, with several blocks positioned adjacent one another spelling the name of the animal with a total picture thereof.

British Pat. No. 214,098, entitled "Improvements in Educational Toys" discloses another set of blocks in which adjacent sides are matingly configured, in the form of a puzzle, with interlocking surfaces.

Italian Pat. No. 584634 discloses another educational set of elements.

The foregoing patents are representative of the state of the art of blocks or placards or the like, bearing indicia or pictorial representations for manipulation and positioning by a child for amusement as well as education.

SUMMARY OF THE INVENTION

In accordance with an aspect of the invention, the block set includes a generally cubical portion with a frusto-pyramidal or convex portion, and a frusto-pyramidally configured mating concave portion for interlocking. Each of the fourteen surfaces or sides thus formed includes a substantially similar pictorial configuration of an animal or the like, with a letter imprinted on the animal, preferably in a portion of the anatomy of the animal which bears a resemblance to the letter. The edges of the block are colored, with each edge being a different color for promoting color awareness, with the like colored edges of adjacent blocks establishing a preferred orientation for pictorial and indicia alignment. The individual pictorial representations on adjacent surfaces of the same block are oriented in different orthogonal directions for enabling reading of a word on the adjoined surfaces of adjacent blocks on at least one other of the adjoined surfaces of the blocks. The block may be formed as a unitary member or may be formed from a sheet of foldable cardboard or the like.

Other objects, features and advantages of the invention will become apparent from a reading of the following specification, when taken in conjunction with the drawings, in which like reference numerals refer to like elements in the several views.

BRIEF DESCRIPTION OF THE DRAWINGS

FIGS. 5a–5c are diagrammatic views illustrating the orientation of the indicia on the opposites sides of the blocks of FIGS. 1 and 2 when stacked and interlocked;

FIGS. 6a–6e are diagrammatic views illustrating the orientation of the indicia on the opposites sides of the blocks of FIGS. 1 and 2 when stacked on the sides with the convex portions oriented in the same direction;

FIGS. 9a–9d are diagrammatic views illustrating the orientation of the indicia on the opposite sides of the blocks of FIGS. 1 and 2 when positioned horizontally with the convex portions nested to the concave portions.

DETAILED DESCRIPTION OF THE PREFERRED EMBODIMENT

Figure 1:
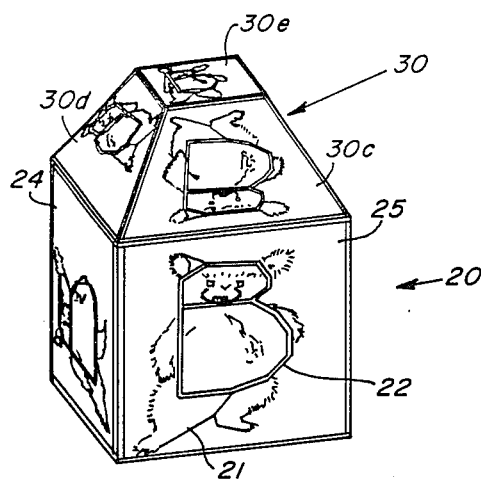
FIG. 1 is a perspective view of a block according to the invention showing a pictorial representation of an animal and a letter of the alphabet associated therewith.
Figure 2:
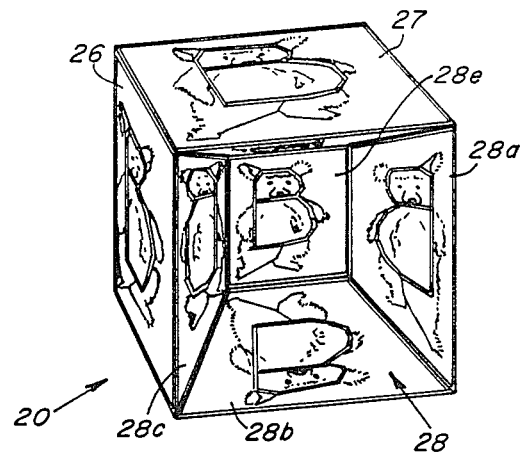
FIG. 2 is a perspective view of a block according to the invention from a bottom angle, showing another pictorial representation and letter of the alphabet.

Referring now to the drawings, and particularly to FIGS. 1 and 2, there is shown a block, generally designated 20, according to the invention, the block 20 having fourteen sides or surfaces, each of which bears a substantially similar pictorial representation 21 of an animal, such as a bear, or the like, with a letter 22 thereon indicative of the first letter of the type of animal, such as the letter "B" for bear.

Figure 3:
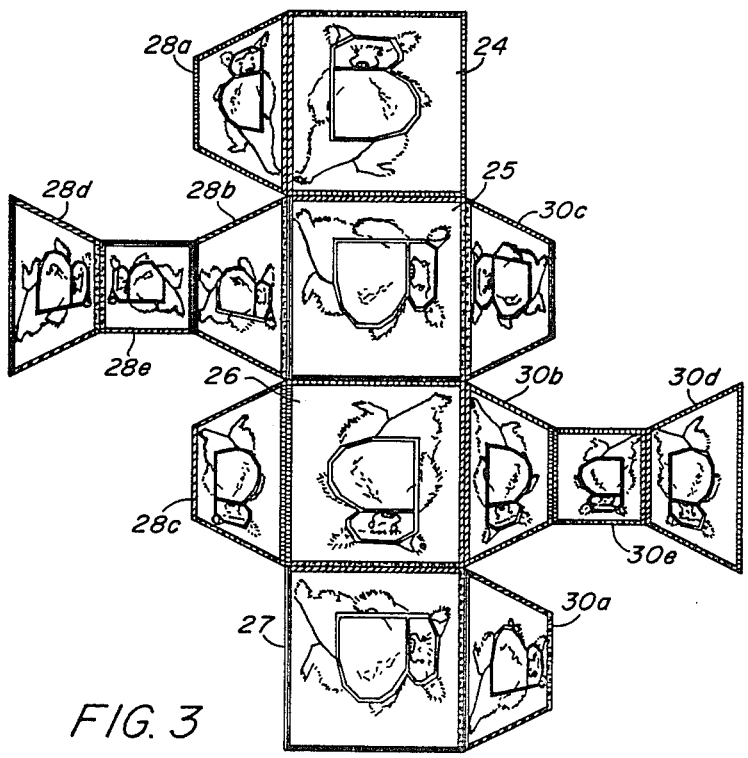
FIG. 3 is a plan view of the block of FIG. 2, with all sides thereof projected in a common plane.

The block 20 has a main body portion having four generally square sides 24–27, with opposing ends formed as concave and convex frusto-pyramids, 28 and 30, each of which has five surfaces 28a–28e and 30a–30e, respectively (See also FIG. 3). By reference to FIG. 3, there is shown a planar depiction of all fourteen sides of the block 20. Sides 24–27 are generally square surfaces. Sides 28a–28d are generally identical and trapezoidally configured with side 28e being a smaller square surface having a side equal to the length of the shorter leg of the trapezoidal sides. Sides 24 and 26 are opposing surfaces of the block 20 as formed, with sides 25 and 27 likewise being opposite surfaces of the block 20.

For purposes of which will be hereafter described, it is to be noted that the pictorial bear representations 21 and the letter 22 thereon, in adjacent sides of the block 20 have different orientations, the orientations being preselected for providing letter and word orientations in a prescribed manner. By way of example, as viewed in FIG. 3, and addressing the large square sides 24–27, the bear 21 on panel or side 24 is vertically arranged for viewing; the bear representation 21 on panel or side 25 is rotated through ninety degrees clockwise to a generally horizontal position; the bear representation 21 on panel or side 26 is rotated clockwise another ninety degrees to an inverted position; and the bear representation 21 on panel or side 27 is in alignment with the representation 21 on panel 25, which, on the block 20, is the opposite side relative thereto.

Viewing from left to right as oriented in FIG. 3, the trapezoidal panel or side 28a, when assembled, depicts a mirror image of side 28e, which is a reduced scale mirror image replica of the bear 21 appearing on panel or side 24, with a vertical or upright orientation. In the next row, the trapezoidal panel or side 28d depicts a reduced scale mirror image representation 21 oriented in the same direction as the bear 21 on panel 25. The next small square panel 28e has a reduced scale image of bear 21 oriented 180 degrees relative to the bear 21 on panel 25, with the intervening trapezoidal panel 28b having a representation similar to, and oriented in the same direction as, bear 21 on panel 28d. The trapezoidal panel 30c along the opposite edge of panel or side 25 includes a mirror image reduced scale replica of bear 21 oriented one hundred eighty degrees to bear 21 on panel 25.

Similarly, all of the other trapezoidal panels 28c, 30a, 30b and 30d have reduced scale mirror images of the bear 21 in different orientations, such as inverted on panels 28c, 30b and 30d; and horizontal on panel 30a, but in alignment with the bear 21 on panel 27 adjacent thereto. The small square panel 30e depicts the bear 21 in an inverted position, oriented and aligned with the bear 21 on panel 26.

Figure 4:
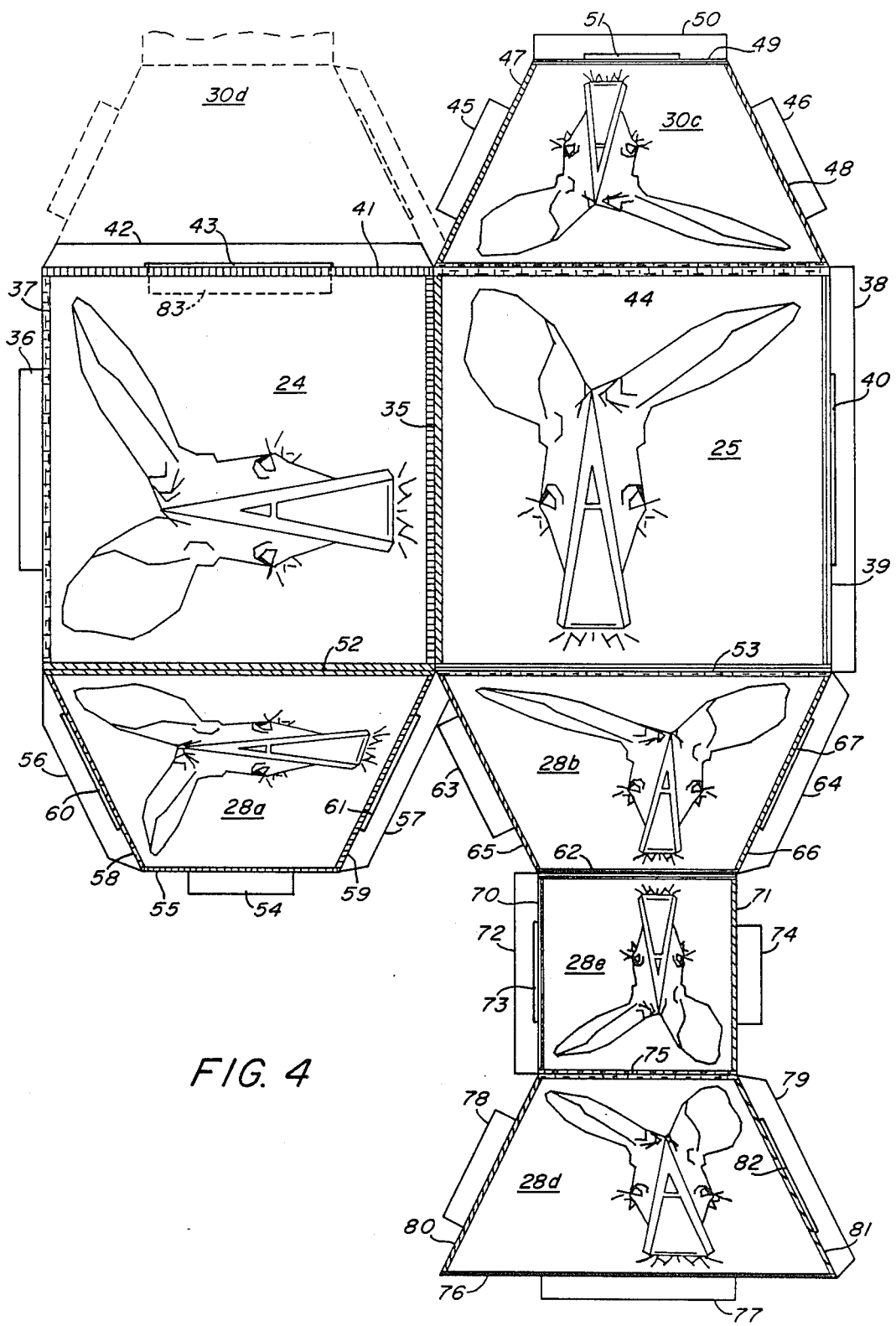
FIG. 4 is a plan view of an imprinted cardboard or paperboard blank, which may be used in conjunction with another like interlocking blank to form the block according to the invention, showing a different pictorial representation and letter, with edges thereof shaded to depict the different colors used in orienting the blocks during use.

FIG. 4 depicts a two dimensional blank or form of paperboard or cardboard, complete with scoring, tab means and slot means for folding and assembly thereof, by interconnection with another like blank or form. Although the block 20, when configured from paperboard may be formed from a single blank, two like blanks are preferable for economy. The blank of FIG. 4 corresponds to the upper half of the planar projection of the block 20 appearing in FIG. 3, that is panels or sides 24 and 25, along with the smaller panels connected thereto, rotated through an angle of ninety degrees counterclockwise.

Panels or sides 24 and 25 are adjacent one another and divided by a score line at the interconnecting edge 35. A short tab 36 projects from the opposite edge 37 of panel 24, while a longer tab 38 projects outwardly from the opposite edge 39, with a slot 40 formed at the edge 39 and having a length generally equal to the length of tab 36.

The upper edge 41 of panel 24 which interconnects edges 35 and 37 has an elongate projecting tab 42 formed with a slot 43 along the edge 41. The ends of tab 42 are suitably beveled to accommodate the pyramidal construction. The aligned edge 44 of panel 25 provides the hinge connection between panel 25 and trapezoidal panel 30c, which has first and second short tabs 45 and 46 projecting from the angular edges 47 and 48, respectively, intermediate the ends thereof. The short leg 49 has a tab 50 projecting therefrom with a slot 51 formed therein along the edge 49.

At the lower edges of panels 24 and 25, aligned edges 52 and 53, respectively, form the hinge connections with trapezoidal panels 28a and 28b. Panel 28a has a tab 54 projecting from the short leg 55, with long tabs 56 and 57 projecting from the angular edges 58 and 59, respectively, each being formed with a slot 60, 61 formed therein at the junction of the edge with the tab. Panel 28b is hingedly coupled at its short leg 62 to an edge of panel 28c, with a short tab 63 and a long tab 64 projecting from the angular edges 65 and 66, respectively, tab 64 being formed with a slot 67 formed therein at the junction of the edge with the tab.

The small square panel 28e, at opposite side edges 70 and 71, includes a long tab 72 with slot 73 and a short tab 74, respectively, projecting therefrom. Trapezoidal panel 28d is interconnected with panel 28e along edge 75, the long leg 76 of the panel 28 having a short tab 77 projecting therefrom. A short tab 78 and a long tab 79 project from the angular edges 80 and 81, respectively, tab 79 being formed with a slot 82 therein at the junction of the edge with the tab. In the upper left corner of the drawing, in dotted lines, there is shown a trapezoidal panel designated 30d with a tab 83 thereof interconnected with slot 43 of tab 42 of panel 24. This dotted line depiction illustrates the interconnection of one blank to another to form the block 20 after appropriate bending or folding and interconnection of the tabs with the slots.

Referring again to FIGS. 3 and 4, the edges are shaded to depict four different colors, the colors selected being green, blue, yellow and red. As any side of the block 20 is viewed, with the original (non-mirror)

representation of the bear 21 properly aligned, that is, vertically oriented and upright, the colored edges are as follows: blue at the bottom edge of the side or panel, yellow at the top edge, red at the right edge and green at the left edge. Thus, if a child is familiar with colors, by arranging the blocks 20 with the colors properly arranged the depictions 21, and consequently, the letters 22, will be properly oriented. That is, for example,if a number of blocks 21 are placed side by side, with blue at the bottom and red at the right, the letters of adjacent blocks will be oriented correctly.

Referring now to FIGS. 5 through 8, there are shown diagrammatical arrangements of the blocks 20 in different stacking relations to illustrate the rational of the orientation of the letters 22 (and the animal or object representations 21).

FIGS. 5a–5c show the front, back and top of a plurality of blocks 20 stacked in a vertically aligned, nested or interlocking arrangement, that is with the upper convex frusto-pyramidal portions 30 received within the concave frusto-pyramidal portions 28, with the blocks 20 spelling the word "blocks" vertically downwardly. The front is shown in FIG. 5a with the opposite side shown in FIG. 5b and the top view of the stack shown in FIG. 5c. As can be seen, the word is spelled in the same orientation on both opposite sides of the stack of blocks.

In FIGS. 6a–6e, the blocks 20 are stacked with the convex frustopyramidal portions 30, in FIG. 6a pointed to the left, that is the blocks are stacked on the planar sides. In this position, with the letters properly oriented, in addition to the word spelled on the front viewable surfaces, the letters of the work also appear in the same orientation on the other three sides, that is in the recesses of the concave portions 28 as shown in FIG. 6b, on the opposite surfaces as shown in FIG. 6c and on the convex portions 30 as shown in FIG. 6d. FIG. 6e shows a top view of the stack of blocks 20.

Figures 7A, 7B, 7C, 7D, 7E:
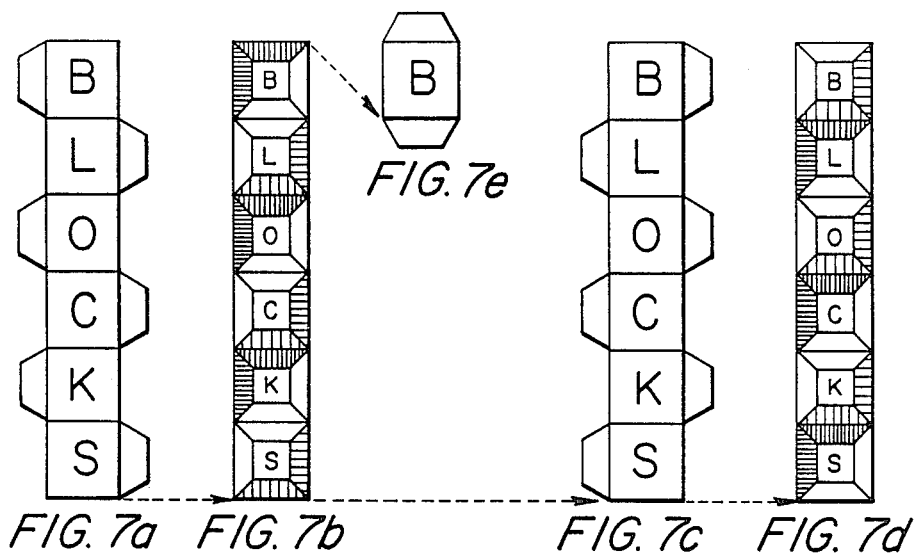
FIGS. 7a–7e are diagrammatic views illustrating the orientation of the indicia on the opposites sides of the blocks of FIGS. 1 and 2 when stacked on the sides with the convex portions alternately oriented in opposing directions.

In FIGS. 7a–7e, the blocks 20 are vertically stacked with the convex frusto-pyramidal portions 30, in FIG. 7a alternately pointed to the left and right, that is the blocks are stacked on the planar sides. In this position, with the letters properly oriented, in addition to the word spelled on the front viewable surfaces, the letters of the work also appear in the same orientation on the other three sides, that is in the alternate recesses and tops of the concave portions 28 and convex portions 30 as shown in FIGS. 7b and 7d, as well as on the opposite planar sides as shown in FIG. 7c. FIG. 7e shows a top view of the stack of blocks 20.

Figures 8A, 8B, 8C, 8D, 8E:
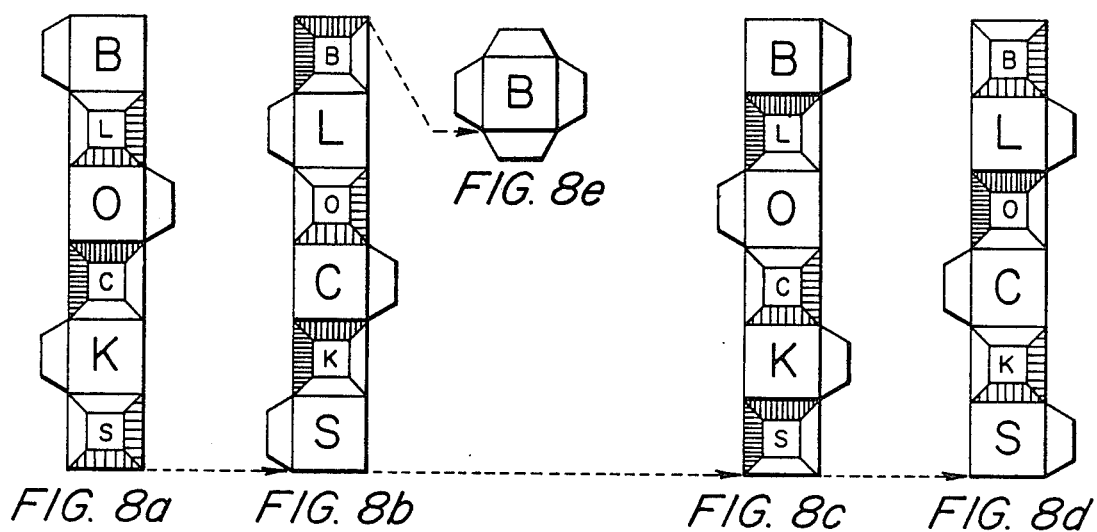
FIGS. 8a–8e are diagrammatic views illustrating the orientation of the indicia on the opposites sides of the blocks of FIGS. 1 and 2 when stacked on the sides with the convex portions sequentially oriented in orthogonal directions.

In FIGS. 8a–8e, the blocks 20 are vertically stacked with the convex frusto-pyramidal portions 30, in FIG. 8a alternately rotated through ninety degrees as the stack progresses upwardly, with the blocks 20 stacked on the planar sides. In this position, with the letters properly oriented, in addition to the word spelled on the front viewable surfaces, the letters of the word also appear in the same orientation on the other three vertical sides, that is on the alternate sides, recesses and tops of the concave portions 28 and convex portions as shown in FIGS. 8b through 8d. FIG. 8e shows a top view of the stack of blocks 20.

FIGS. 9a–9d depict the blocks 20 positioned horizontally with the blocks nested and the convex portion 30 facing to the right in the front view of FIG. 9a. The opposite side shown in FIG. 9b has the letters in reverse order, although oriented properly.

In accordance with the present invention, as shown in FIGS. 1 through 4, the pictorial representations 21 are in the form of animals, with the letter 22 appropriate thereto being fancifully configured to conform to a portion of the anatomy of the respective animal.

It is to be understood that the pictorial representations 21 may be any object, such as vegetation, the sun or the moon, or inanimate objects such as cars, trains and the like. In the latter instances, the letters appropriate thereto would be formed in some part of the structure thereof similar to the indicia on the blocks 20 shown and described herein.

It is also to be understood that although the preferred embodiment shows frusto-pyramidal constructions for the convex and concave portions 30 and 28, respectively, if the block 20 is formed as a unitary member, these convex and concave portions may be formed as a somewhat domed convex and concave configuration for matingly nesting and stacking.

It is further to be understood that the blocks ar shown stacked or positioned in certain arrangements for explanation of use, however, these arrangements are not intended to be limiting since many other educational and amusing arrangements are possible within the scope of the invention.

While there has been shown and described a preferred embodiment, it is to be further understood that various other adaptations and modifications may be made within the spirit and scope of the invention.

What is claimed is:

1. A block set comprising a plurality of like blocks, each of said blocks having a generally cubical configuration with four like orthogonally arranged adjacent panels of given dimensions, a convex portion extending in a first direction from said four like panels, and a concave portion opposite said convex portion and formed at least partially within the dimensions of said four like panels, wherein said convex portion and said concave portion are each frusto-pyramidally configured and are configured and dimensioned for mating stacking engagement with substantially all surfaces of the convex portion of one block in abutting relation with substantially all surfaces of the concave portion of another block, and wherein each of said blocks is formed from two generally identically configured blanks of paperboard material, each of said blanks including:

a first generally square panel portion;

a second generally square panel portion connected to said first panel portion;

third and fourth panel portions configured as substantially identical trapezoids with the base thereof being a long leg with the side opposite thereto being a short leg, said trapezoids having the long legs thereof connected to opposite edges of said first panel portion perpendicular to the connection of said first and second panel portions;

a fifth panel portion configured as a trapezoid substantially identical to said third and fourth panel portions and having the long leg thereof connected to the edge of said second panel portion perpendicular to said connecting edge with said first panel portion;

a sixth generally square panel portion having a dimension generally equal to the short leg of said fourth panel portion and connected thereto;

a seventh panel portion of generally trapezoidal configuration substantially identical to said third and fourth panel portions and having the short leg thereof connected to an edge of said sixth panel portion opposite the connecting edge with said fourth panel portion; and tab means on the majority of non-connecting edges of said panel portions for enabling connection of said blank with another like blank to form a fourteen sided geometric figure.

2. The combination according to claim 1 wherein said the first and second panel portions of both of said two blanks form said four like panels and contain like pictorial representations of an object.

3. The combination according to claim 2 wherein each of said like panels includes letter indicia associated with said object.

4. The combination according to claim 3 wherein at least two opposing panels have the representation thereon oriented for viewing in the same orientation of the block.

5. The combination according to claim 2 wherein each panel of said four like panels has the pictorial representations on at least two adjacent panels oriented orthogonally relative to one another.

6. The combination according to claim 5 wherein each edge of each of one of said panels includes a different color, and at least one other panel includes edges of the same colors in the same sequence with the bottom edge relative to the bottom of each pictorial representation being the same color.

7. The combination according to claim 1 wherein each of said blocks includes fourteen panels, each bearing a like pictorial representation of an object.

8. The combination according to claim 7 wherein each of said fourteen panels includes indicia on said object related to said object.

9. The combination according to claim 8 wherein said indicia is one of a letter and the mirror image of the letter.

10. The combination according to claim 9 wherein said indicia is superimposed on the object at a portion of the object bearing a resemblance to the indicia.

11. In a blank for forming a block from paperboard or the like, the combination comrpising:

a first generally square panel portion;

a second generally square panel portion connected to said first panel portion;

third and fourth panel portions configured as substantially identical trapezoids with the base thereof being a long leg with the side opposite thereto being a short leg, said trapezoids having the long legs thereof connected to opposite edges of said first panel portion perpendicular to the connection of said first and second panel portions;

a fifth panel portion configured as a trapezoid substantially identical to said third and fourth panel portions and having the long leg thereof connected to the edge of said second panel portion perpendicular to said connecting edge with said first panel portion;

a sixth generally square panel portion having a dimension generally equal to the short leg of said fourth panel portion and connected thereto;

a seventh panel portion of generally trapezoidal configuration substantially identical to said third and fourth panel portions and having the short leg thereof connected to an edge of said sixth panel portion opposite the connecting edge with said fourth panel portion; and tab means on the majority of non-connecting edges of said panel portions for enabling connection of said blank with another like blank to form a fourteen sided geometric figure.

12. The combination according to claim 11 wherein said blank is configured for joining with another like blank for forming a block configured as a geometric figure having four generally square sides forming an enclosure from the first and second panel portions of the two blanks, with the second through seventh panel portions of the two blanks forming opposing frusto-pyramidal concave and convex portions which are matingly engageable with like structure of other blocks so formed.

13. The combination according to claim 12 wherein said block is one of a plurality of like geometrically configured blocks forming a block set.

14. The combination according to claim 12 wherein each of the panels of said four generally square sides contains a like pictorial representation of an object.

15. The combination according to claim 14 wherein each of the panels of said four generally square sides includes letter indicia associated with said object.

16. The combination according to claim 15 wherein at least two opposing panels of said four generally square sides have the representation thereon oriented for viewing in the same orientation of the block so formed by said blanks.

17. The combination according to claim 14 wherein each of the panels of said four generally square sides has the pictorial representations on at least two adjacent panels oriented orthogonally relative to one another.

18. The combination according to claim 17 wherein each edge of one of the panels of said four generally square sides includes a different color, and at least one other panel includes edges of the same colors in the same sequence with the bottom edge relative to the bottom of each pictorial representation being the same color.

19. The combination according to claim 12 wherein each of the fourteen panels forming said blocks bears a like pictorial representation of an object.

20. The combination according to claim 19 wherein each of said fourteen panels includes indicia on said object related to said object.

21. The combination according to claim 19 wherein said indicia is one of a letter and the mirror image of the letter.

22. The combination according to claim 21 wherein said indicia is superimposed on the object at a portion of the object bearing a resemblance to the indicia.

23. The combination according to claim 14 wherein at least one other or said blocks contains a pictorial representation of a different object and each of said blocks contains a letter associated with the object thereon, and the pictorial representations on different panels are so oriented that upon positioning a plurlity of blocks in adjacent relation to form a word, the surface of the adjoined blocks viewed from the opposite direction has the letters thereon arranged for displaying the same word.

24. The combination according to claim 23 wherein each edge of each of one of said panels includes a different color, and at least one other panel includes edges of the same colors in the same sequence with an edge corresponding to the bottom of each pictorial representation being the same color, and with said plurality of blocks arranged in adjoined relation to form a word, like colored edges on adjacent panels of the adjoined blocks have like orientation.

25. A block set comprising a plurality of like blocks, each of said blocks having a generally cubical configuration with four like orthogonally arranged adjacent panels of given dimensions, a frusto-pyramidal convex portion extending in a first direction from said four like panels, and a frusto-pyramidal concave portion opposite said convex portion and formed at least partially within the dimensions of said four like panels thus forming fourteen surfaces in said panels, each of said panels containing a like pictorial representation of an object, and wherein each of said blocks is formed from two generally identically configured blanks of paperboard material, each of said blanks including a first generally square panel portion;

a second generally square panel portion connected to said first panel portion;

third and fourth panel portions configured as substantially identical trapezoids with the base thereof being a long leg with the side opposite thereto being a short leg, said trapezoids having the long legs thereof connected to opposite edges of said first panel portion perpendicular to the connection of said first and second panel portions;

a fifth panel portion configured as a trapezoid substantially identical to said third and fourth panel portions and having the long leg thereof connected to the edge of said second panel portion perpendicular to said connecting edge with said first panel portion;

a sixth generally square panel portion having a dimension generally equal to the short leg of said fourth panel portion and connected thereto;

a seventh panel portion of generally trapezoidal configuration substantially identical to said third and fourth panel portions and having the short leg thereof connected to an edge of said sixth panel portion opposite the connecting edge with said fourth panel portion; and tab means on the majority of non-connecting edges of said panel portions for enabling connection of said blank with another like blank to form a fourteen sided geometric figure.

26. The combination according to claim 25 wherein at least one other of said blocks contains a pictorial representation of a different object and each of said blocks contains a letter associated with the object thereon, and the pictorial representations on different panels are so oriented that upon positioning a plurality of blocks in adjacent relation to form a word, the surface of the adjoined blocks viewed from the opposite direction has the letters thereon arranged for displaying the same word.

27. The combination according to claim 26 wherein each edge of each of one of said panels includes a different color, and at least one other panel includes edges of the same colors in the same sequence with an edge corresponding to the bottom of each pictorial representation being the same color, and with said plurality of blocks arranged in adjoined relation to form a word, like colored edges on adjacent panels of the adjoined blocks have like orientation.

* * * * *